(12) United States Patent
Li

(10) Patent No.: US 11,833,794 B2
(45) Date of Patent: Dec. 5, 2023

(54) MULTI-FUNCTIONAL LAMINATOR

(71) Applicant: Hubei Fangnuo Technology Co., Ltd, Wuhan (CN)

(72) Inventor: Ling Li, Wuhan (CN)

(73) Assignee: Hubei Fangnuo Technology Co., Ltd

( * ) Notice: Subject to any disclaimer, the term of this patent is extended or adjusted under 35 U.S.C. 154(b) by 73 days.

(21) Appl. No.: 17/573,672

(22) Filed: Jan. 12, 2022

(65) Prior Publication Data
US 2023/0219334 A1  Jul. 13, 2023

(51) Int. Cl.
*B32B 37/00* (2006.01)
*B32B 38/00* (2006.01)
*B32B 38/04* (2006.01)

(52) U.S. Cl.
CPC ...... *B32B 37/0046* (2013.01); *B32B 38/0004* (2013.01); *B32B 38/04* (2013.01); *B32B 2037/0061* (2013.01); *B32B 2038/047* (2013.01)

(58) Field of Classification Search
CPC . B32B 37/0046; B32B 38/0004; B32B 38/04; B32B 2037/0061; B32B 2038/047; B32B 2038/045
See application file for complete search history.

(56) References Cited

FOREIGN PATENT DOCUMENTS

| CN | 210617328 U | * | 5/2020 |
| CN | 210706437 U | * | 6/2020 |
| DE | 20-2006000121 U | * | 3/2006 |

OTHER PUBLICATIONS

DSB, TM-20 A4 Manual Paper Cutter, https://www.dsbnet.com/dsb-product/paper-cutter/manual-paper-cutter/a4-manual-paper-cutter.html, Aug. 4, 2020. (Year: 2020).*

* cited by examiner

*Primary Examiner* — Christopher W Raimund

(57) ABSTRACT

Disclosed is a novel multi-functional laminator, having a laminator body. The laminator body is equipped with a lamination channel for a paper or photo to pass, mounting columns are disposed on two sides of the laminator body respectively, and a sliding rod is disposed between the mounting columns. The novel multi-functional laminator is further equipped with a cutting/perforation integrated mechanism, and the cutting/perforation integrated mechanism is slidably connected to the sliding rod via a sliding hole. When cutting is needed, the paper or photo is placed below the cutting/perforation integrated mechanism and slides for cutting; and when perforation is needed, the paper or photo is placed at a paper inlet of the cutting/perforation integrated mechanism for perforation. A cutting knife and a perforation knife are integrated in the laminator while the volume is applicable; and with a collector added for recycling waste paper after perforation, the use is more convenient.

6 Claims, 5 Drawing Sheets

MULTI-FUNCTIONAL LAMINATOR

TECHNICAL FIELD

The present utility model relates to the technical field of cutting tools of office supplies, in particular to a novel multi-functional laminator.

BACKGROUND

People living in cities often waste much precious time in arranging office supplies on tables and in kitchen cabinets due to narrow office space. Among the office supplies, perforating machines, cutting mechanism and the like are necessities for office work. Therefore, how to integrate these office supplies into multi-functional ones capable of remarkably reducing space occupation has become an important research subject for those skilled in the art.

There are different specifications of traditional perforating machines for paper perforation, and there are also different forms of folders for arranging documents and data, such as two-hole, three-hole, four-hole folders, which results in numerous and complicated varieties of existing perforating machines, including large ones hard to store. In addition, paper cutting is performed with scissors, utility knives or cutting machines. The cutting with scissors and utility knives is slow, and the edges of the cut paper are not straight and neat. The cutting machines, despite the advantages of flat and straight cuts and fast cutting, still have the problem of large volume and thus are hard to store.

SUMMARY

In response to the shortcomings of the prior art, an objective of the present utility model is to provide a novel multi-functional laminator, which realizes an integrated design of cutting and perforation through an integrated mechanism, thereby making it easier for consumers to use.

To achieve the above objectives, the present utility model adopts the following technical solution.

A novel multi-functional laminator, having a laminator body, the laminator body being equipped with a lamination channel for a paper or photo to pass, where mounting columns are disposed on two sides of the laminator body respectively, and a sliding rod is disposed between the mounting columns; the novel multi-functional laminator is further equipped with a cutting/perforation integrated mechanism, and the cutting/perforation integrated mechanism is slidably connected to the sliding rod via a sliding hole; when cutting is needed, the paper or photo is placed below the cutting/perforation integrated mechanism and slides for cutting; and when perforation is needed, the paper or photo is placed at a paper inlet of the cutting/perforation integrated mechanism for perforation.

It should be noted that a cover plate is disposed on a surface of the laminator body between the mounting columns, and the cutting/perforation integrated mechanism slides above the cover plate.

It should be noted that a gap is disposed between the cover plate and the surface of the laminator body.

It should be noted that the cutting/perforation integrated mechanism is equipped with a frame body, a cutting knife and a perforation mechanism; the frame body is mounted at a bottom of a shell, the cutting knife is disposed at a bottom of one side of the frame body, and the perforation mechanism is disposed on the other side of the frame body; a paper inlet is disposed on the other side of the frame body, and the perforation mechanism is communicated with the paper inlet; and a sliding chute is disposed along a length direction of the cover plate, and the cutting knife is located in the sliding chute.

It should be noted that the perforation mechanism comprises a press block partially protruding out of the shell, a perforation knife and a spring; the perforation knife is disposed at a bottom of the press block, a first through hole is disposed in a surface of the other side of the frame body, and a second through hole coaxial with the first perforation hole is disposed in a surface of the paper inlet; the spring is wound on a periphery of the perforation knife, one end of the spring is in butt joint with the bottom of the press block, and the other end of the spring is in butt joint with the surface of the other side of the frame body; and when the press block is pressed down, the perforation knife passes through the first through hole and the second through hole and can perforate a paper stretching into the paper inlet.

It should be noted that a limiting baffle vertically extending upward is disposed on the surface of the other side of the frame body, and when the press block is pressed down to a certain position, a periphery of a bottom of the frame body is in butt joint with a top surface of the limiting baffle.

It should be noted that a guide column is disposed on an inner wall of the shell, and concave holes in fastening joint with the guide column are disposed in peripheries of two sides of the press block; and when the press block is pressed down or reset, the concave holes move along the guide column.

It should be noted that the novel multi-functional laminator is further equipped with a collection chamber, where insertion slots are disposed on two sides of a bottom of the paper inlet, and cross rods movably connected to the insertion slots are disposed on inner surfaces of two sides of the collection chamber; and waste paper produced by paper perforation falls into the collection chamber.

It should be noted that the novel multi-functional laminator is further equipped with a protective cover, where in a normal state, the cutting knife is covered with the protective cover.

Beneficial effects: the structure is simple, and the setting is reasonable; a cutting knife and a perforation knife are integrated in the laminator while the volume is applicable; and with a collector added for recycling waste paper after perforation, the use is more convenient.

DETAILED DESCRIPTION

The present utility model will further be described below in combination with the accompanying drawings. It should be noted that the present example provides detailed implementations and a specific operation process based on the present technical solution. However, the scope of protection of the present utility model is not limited to the present example.

Figure 1:
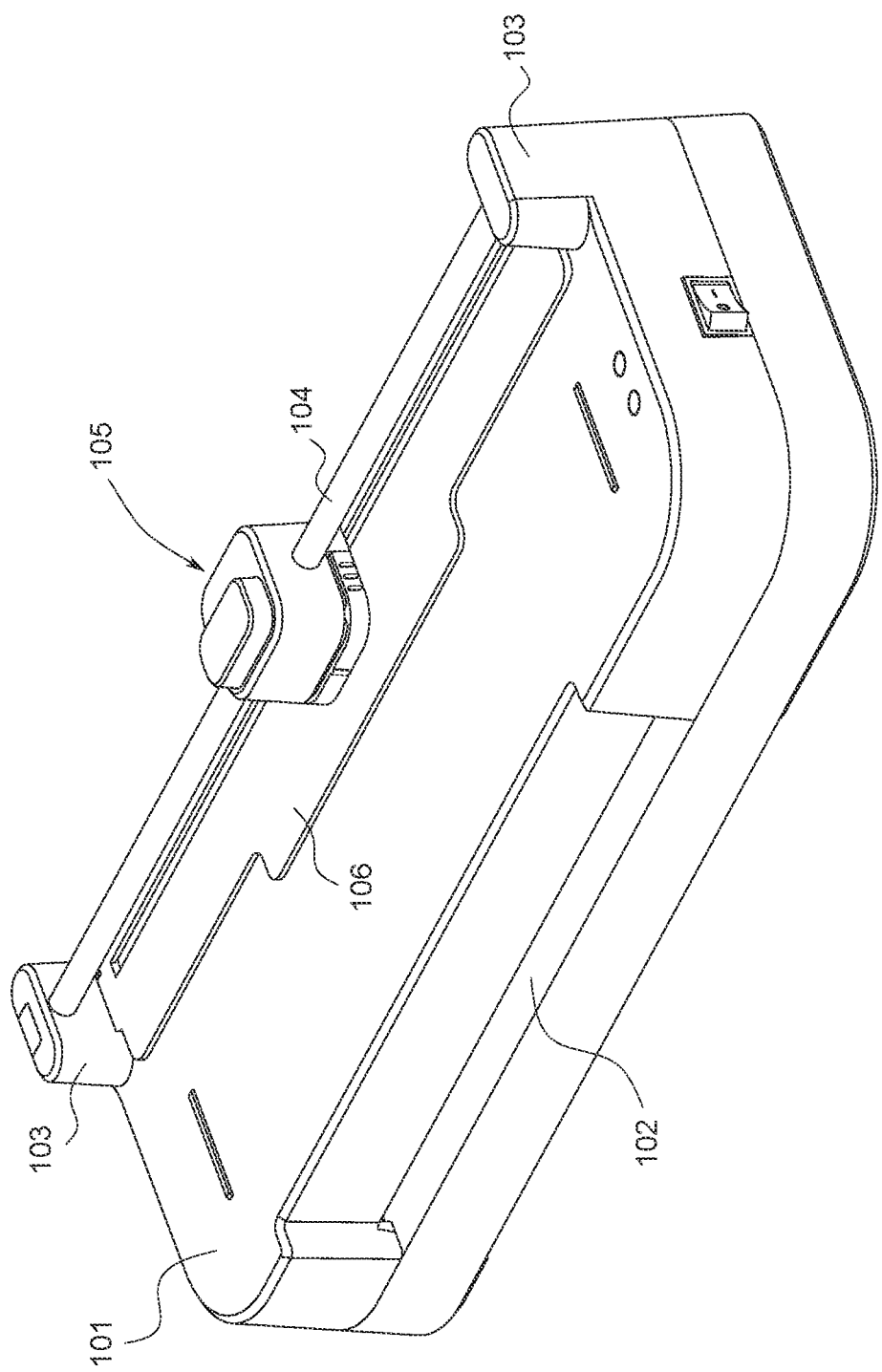
FIG. 1 is a schematic structural diagram of the present utility model.
Figure 2:
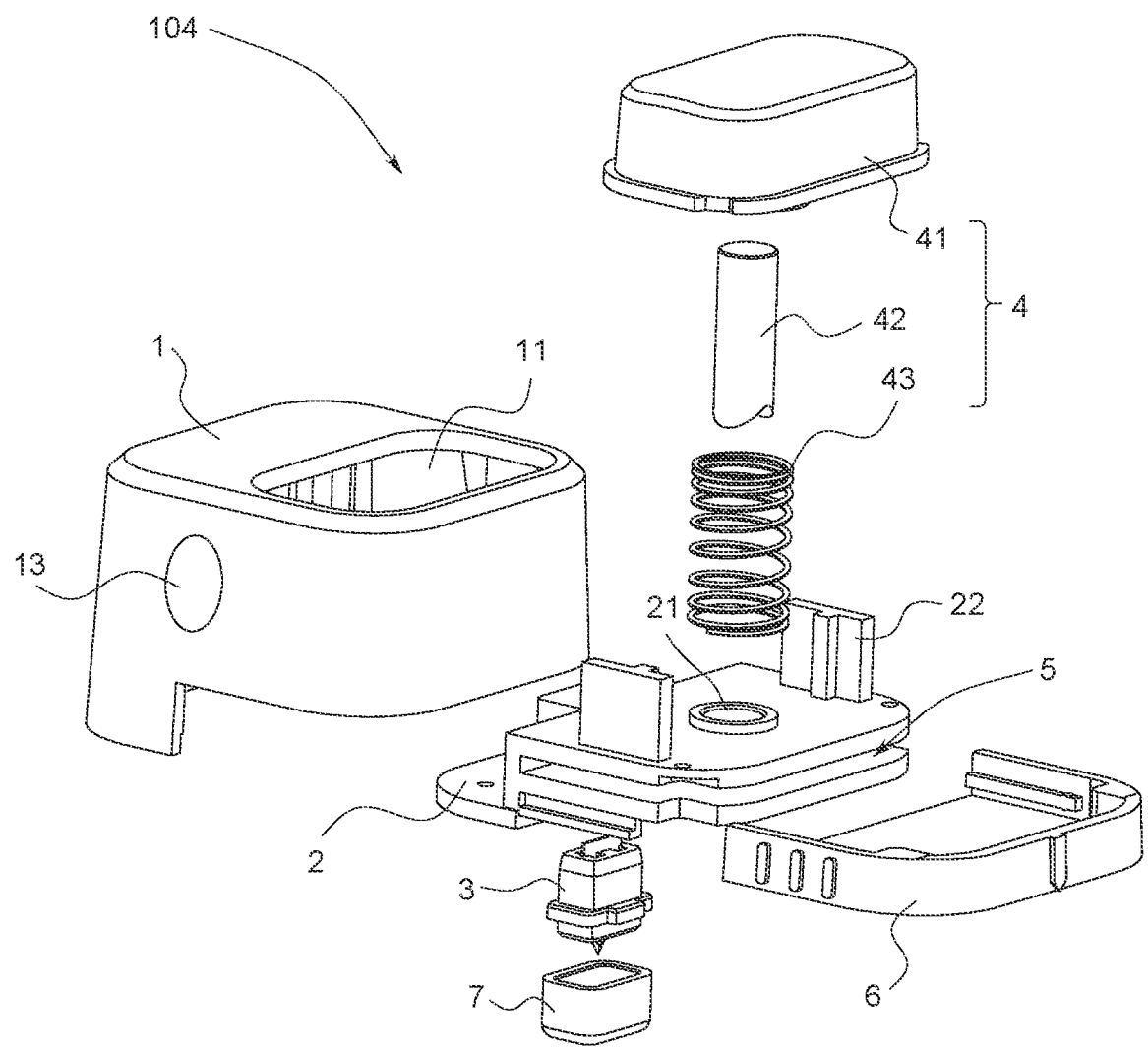
FIG. 2 is a schematic structural diagram of a cutting/perforation integrated mechanism in FIG. 1.

As shown in FIG. 1 and FIG. 2, the present utility model is a novel multi-functional laminator, having a laminator body 101. The laminator body 101 is equipped with a lamination channel 102 for a paper or photo to pass, mounting columns 103 are disposed on two sides of the laminator body 101 respectively, and a sliding rod 104 is disposed between the mounting columns 103. The novel multi-functional laminator is further equipped with a cutting/perforation integrated mechanism 105, and the cutting/perforation integrated mechanism 105 is slidably connected to the sliding rod 104 via a sliding hole 13.

It should be noted that when cutting is needed, the paper or photo is placed below the cutting/perforation integrated mechanism and slides for cutting; and when perforation is needed, the paper or photo is placed at a paper inlet of the cutting/perforation integrated mechanism for perforation.

Further, as shown in FIG. 1, a cover plate 106 is disposed on a surface of the laminator body 101 between the mounting columns 103, and the cutting/perforation integrated mechanism 105 slides above the cover plate 106.

It should be noted that the cover plate is made from a transparent material; and still further, a gap is disposed between the cover plate and the surface of the laminator body, and the gap is enough for a paper or photo to enter to perform cutting.

Further, as shown in FIG. 2, the cutting/perforation integrated mechanism 105 has a shell 1 equipped with a frame body 2, a cutting knife 3 and a perforation mechanism 4; the frame body 2 is mounted at a bottom of the shell 1, the cutting knife 3 is disposed at a bottom of one side of the frame body 2, and the perforation mechanism 4 is disposed on the other side of the frame body 2; and a paper inlet 5 is disposed on the other side of the frame body 2, and the perforation mechanism 4 is communicated with the paper inlet 5.

Figure 3:
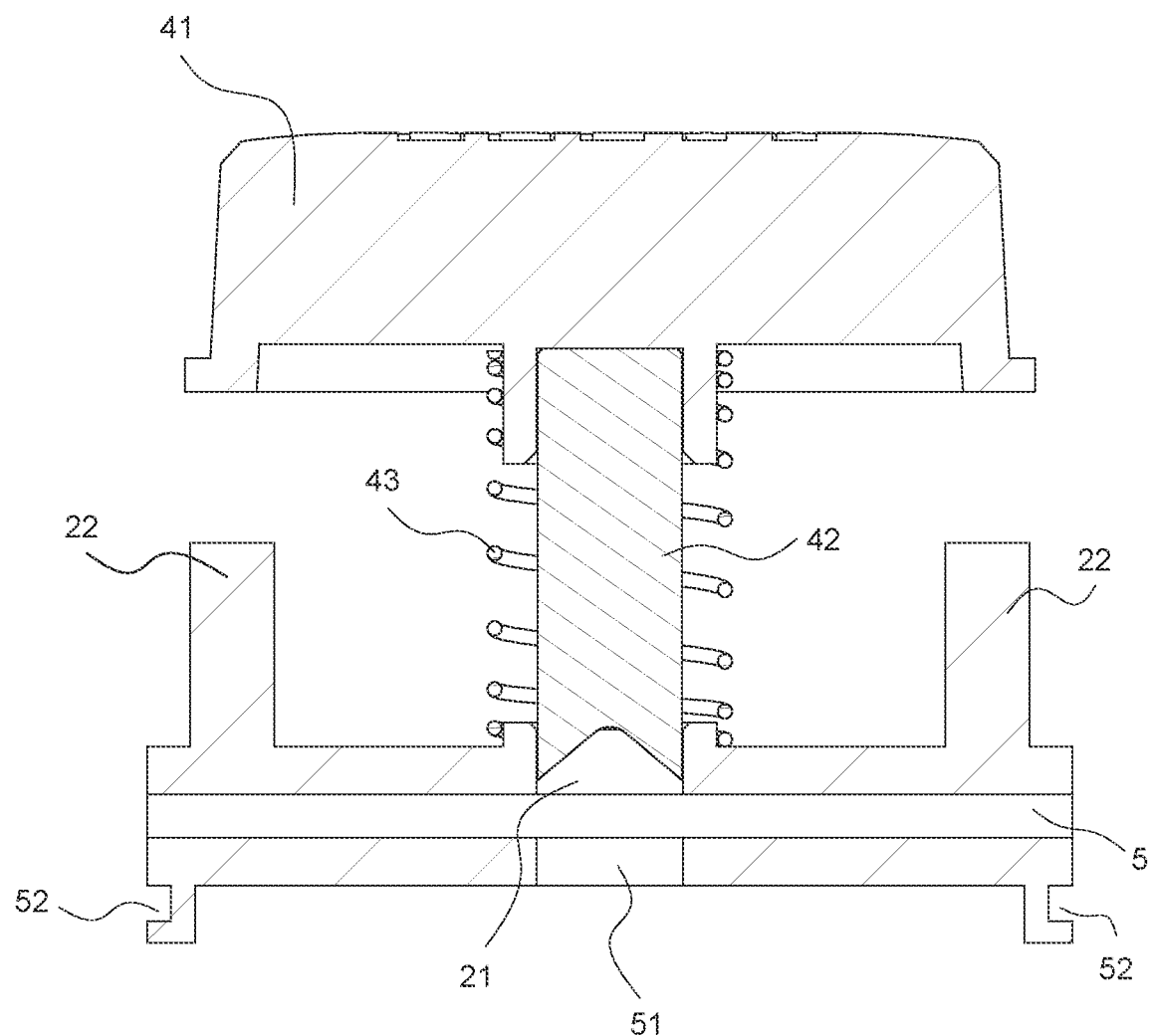
FIG. 3 is a schematic structural cross-sectional view of a perforation mechanism in FIG. 2.

Further, as shown in FIG. 2 and FIG. 3, an opening 11 is disposed in a top of the shell 1, the perforation mechanism 4 includes a press block 41 partially protruding out of the opening 11, a perforation knife 42 and a spring 43; the perforation knife 42 is disposed at a bottom of the press block 41, a first through hole 21 is disposed in a surface of the other side of the frame body 2, and a second through hole 51 coaxial with the first perforation hole 21 is disposed in a surface of the paper inlet 5; the spring 43 is wound on a periphery of the perforation knife 42, one end of the spring 43 is in butt joint with the bottom of the press block 41, and the other end of the spring is in butt joint with the surface of the other side of the frame body 2; and further, a sliding chute is opened along a length direction of the cover plate, and the cutting knife is located in the sliding chute.

In use, when the press block is pressed down, the perforation knife passes through the first through hole and the second through hole and can perforate the paper stretching into the paper inlet.

Further, in order to guarantee vertical movement of the perforation knife within a certain range, as shown in FIG. 2 and FIG. 3, a limiting baffle 22 vertically extending upward is disposed on the surface of the other side of the frame body 2. When the press block is pressed down to a certain position, a periphery of a bottom of the frame body is in butt joint with a top surface of the limiting baffle, thereby avoiding excessive displacement of the perforation knife.

Figure 4:
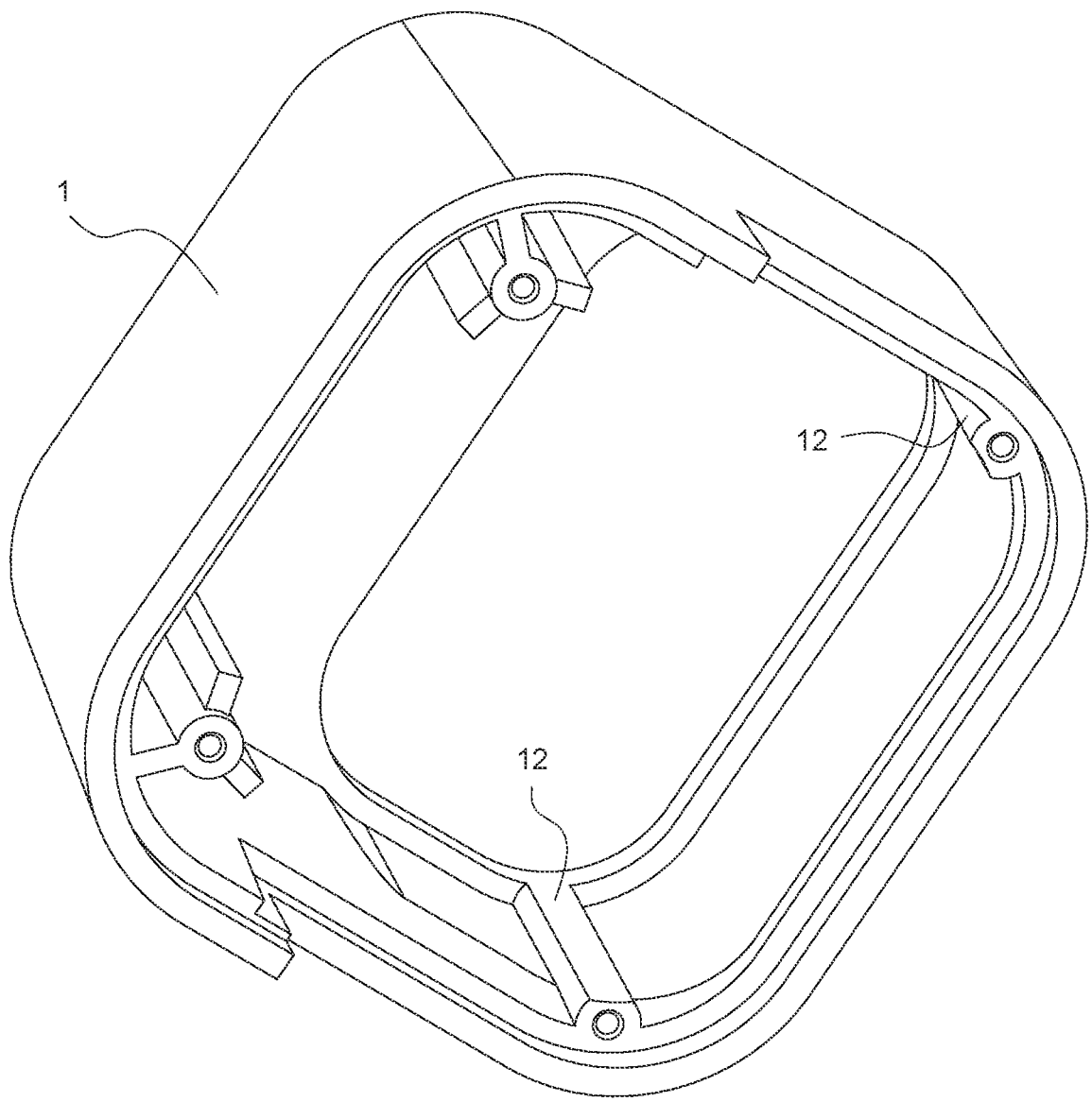
FIG. 4 is an inner surface schematic structural diagram of a shell in FIG. 2.

Still further, in order to maintain steady movement of the perforation mechanism in the shell, as shown in FIG. 2 and FIG. 4, a guide column 12 is disposed on an inner wall of the shell 1, and concave holes 411 in fastening joint with the guide column 12 are disposed in peripheries of two sides of the press block 41; and when the press block is pressed down or reset, the concave holes move along the guide column.

Figure 5:
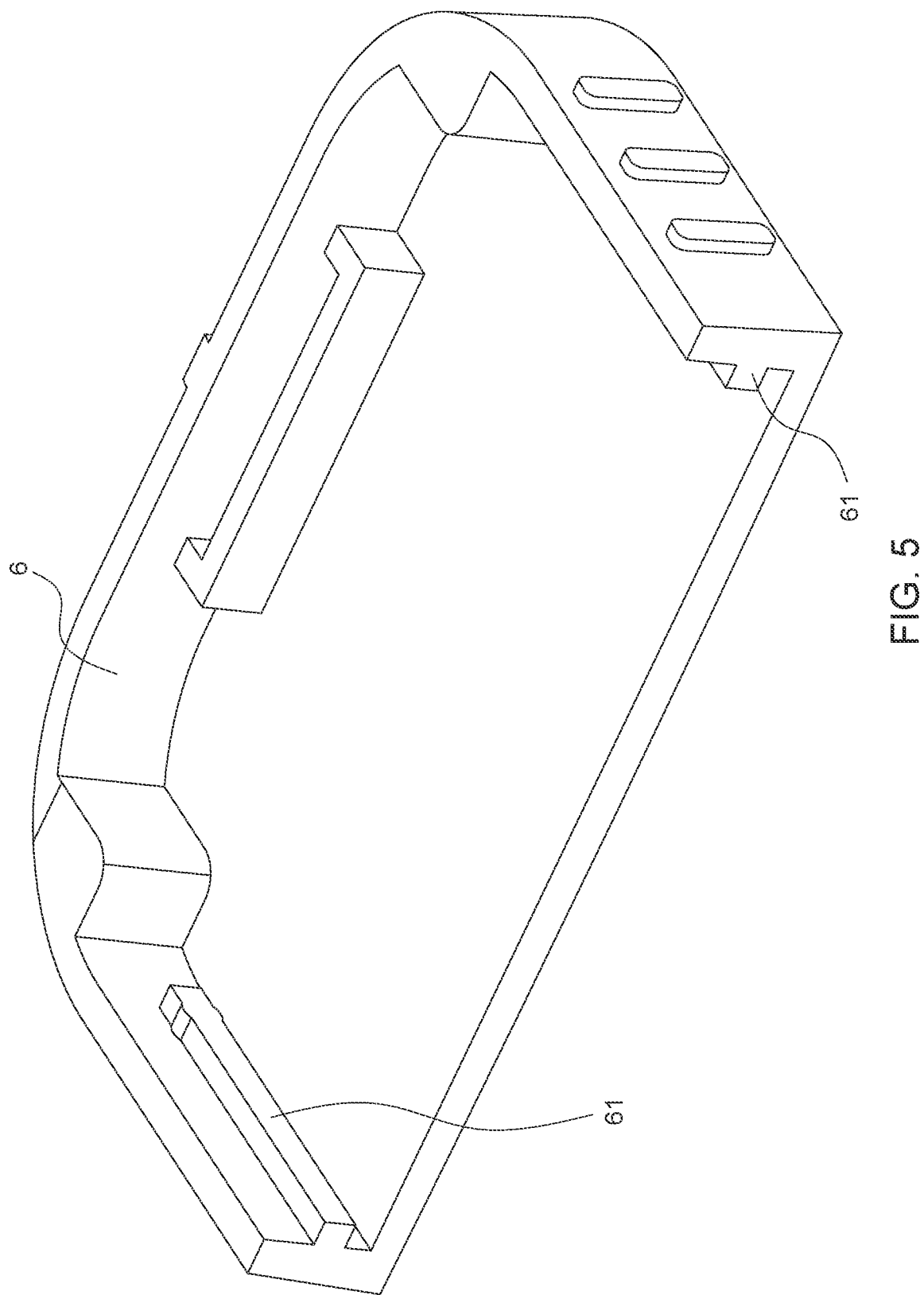
FIG. 5 is a schematic structural view of a collection chamber in FIG. 2.

In order to effectively collect the waste paper produced by perforation, as shown in FIG. 2 and FIG. 5, the novel multi-functional laminator is further equipped with a collection chamber 6; insertion slots 52 are disposed on two sides of a bottom of the paper inlet 5, and cross rods 61 movably connected to the insertion slots 52 are disposed on inner surfaces of two sides of the collection chamber 6; and the waste paper produced by paper perforation falls into the collection chamber.

In order to guarantee safe use of the cutting knife, as shown in FIG. 2, the novel multi-functional laminator is further equipped with a protective cover 7; and in a normal state, the cutting knife 3 is covered with the protective cover 7.

Embodiment 1

When using the lamination function of the present utility model, the paper or photo to be laminated is put on a plastic sheet and then in the lamination channel. At this time, the present utility model will perform automatic lamination.

Embodiment 2

When using the cutting function of the present utility model, the protective cover is removed, the paper or photo to be cut is pushed to below the cover plate, and then the cutting knife is moved through the paper for cutting.

Embodiment 3

When the present utility model is used to perforate paper, paper to be perforated is stretched into the paper inlet (one or more pieces), and located between the first through hole and the second through hole; then the press block is pressed down. At this time, the spring is in a compressed state, the perforation knife passes through the first through hole to perforate the paper, and then passes through the second through hole to push the waste paper produced by perforation into the collection chamber below the paper inlet; and finally, the paper is taken out to finish the perforation. Finally, the collection chamber is pulled out, and the waste paper produced by perforation can be poured out.

For those skilled in the art, various corresponding modifications and variations can be made according to the above technical solution and conception, and all the modifications and variations shall be included within the protection scope of the claims of the present utility model.

What is claimed is:

1. A novel multi-functional laminator, having a laminator body, the laminator body being equipped with a lamination channel for a paper or photo to pass, wherein
   mounting columns are disposed on two sides of the laminator body respectively, and a sliding rod is disposed between the mounting columns, and
   a cover plate is disposed on a surface of the laminator body between the mounting columns;
   the novel multi-functional laminator is further equipped with a cutting/perforation integrated mechanism, and the cutting/perforation integrated mechanism slides above the cover plate and the cutting/perforation integrated mechanism is slidably connected to the sliding rod via a sliding hole, wherein the cutting/perforation integrated mechanism is equipped with a frame body, a cutting knife and a perforation mechanism; the frame body is mounted at a bottom of a shell, the cutting knife is disposed at a bottom of one side of the frame body, and the perforation mechanism is disposed on the other side of the frame body; a paper inlet is disposed on the other side of the frame body, and the perforation mechanism is communicated with the paper inlet and a sliding chute is disposed along a length direction of the cover plate, and the cutting knife is located in the sliding chute, the perforation mechanism comprises a press block partially protruding out of the shell, a perforation knife and a spring; the perforation knife is disposed at a bottom of the press block, a first through hole is disposed in a surface of the other side of the frame body, and a second through hole coaxial with the first through hole is disposed in a surface of the paper inlet the spring is wound on a periphery of the perforation knife, one end of the spring is in butt joint with the bottom of the press block, and the other end of the spring is in butt joint with the surface of the other side of the frame body; and when the press block is pressed down, the perforation knife passes through the first through hole and the second through hole and perforates paper stretching into the paper inlet, and when cutting is needed, the paper or photo is placed below the cutting/perforation integrated mechanism and slides for cutting; and when perforation is needed, the paper or photo is placed at a paper inlet of the cutting/perforation integrated mechanism for perforation.

2. The novel multi-functional laminator according to claim 1, wherein a gap is disposed between the cover plate and the surface of the laminator body.

3. The novel multi-functional laminator according to claim 1, wherein a limiting baffle vertically extending upward is disposed on the surface of the other side of the frame body, and when the press block is pressed down to a certain position, a periphery of a bottom of the frame body is in butt joint with a top surface of the limiting baffle.

4. The novel multi-functional laminator according to claim 1, wherein a guide column is disposed on an inner wall of the shell, and concave holes in fastening joint with the guide column are disposed in peripheries of two sides of the press block; and when the press block is pressed down or reset, the concave holes move along the guide column.

5. The novel multi-functional laminator according to claim 1, further equipped with a collection chamber, wherein insertion slots are disposed on two sides of a bottom of the paper inlet, and cross rods movably connected to the insertion slots are disposed on inner surfaces of two sides of the collection chamber; and waste paper produced by paper perforation falls into the collection chamber.

6. The novel multi-functional laminator according to claim 1, further equipped with a protective cover, wherein in a normal state, the cutting knife is covered with the protective cover.

* * * * *